United States Patent
DeKoning et al.

(10) Patent No.: US 6,823,472 B1
(45) Date of Patent: Nov. 23, 2004

(54) SHARED RESOURCE MANAGER FOR MULTIPROCESSOR COMPUTER SYSTEM

(75) Inventors: Rodney A. DeKoning, Augusta, KS (US); John Kloeppner, Buhler, KS (US); Dennis Gates, Witchita, KS (US); Keith Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/569,194

(22) Filed: May 11, 2000

(51) Int. Cl.[7] ............................................. G06F 11/00
(52) U.S. Cl. ............................... 714/10; 710/56
(58) Field of Search ..................... 714/10, 9, 11, 714/12, 38, 39, 40; 710/37, 38, 56, 113, 119, 309; 379/9.01, 10.01; 717/120, 177, 178, 172

(56) References Cited

U.S. PATENT DOCUMENTS

| | | | | |
|---|---|---|---|---|
| 4,811,216 A | * | 3/1989 | Bishop et al. ............. | 711/153 |
| 4,862,347 A | | 8/1989 | Rudy ........................ | 364/200 |
| 4,964,040 A | | 10/1990 | Wilcox ...................... | 364/200 |
| 5,317,757 A | | 5/1994 | Medicke et al. ........... | 395/800 |
| 5,357,632 A | | 10/1994 | Pian et al. .................. | 395/650 |
| 5,367,678 A | * | 11/1994 | Lee et al. ................... | 709/104 |
| 5,432,908 A | | 7/1995 | Heddes et al. ............. | 395/250 |
| 5,434,970 A | | 7/1995 | Schiffleger ................. | 395/200 |
| 5,442,789 A | | 8/1995 | Baker et al. ................ | 395/650 |
| 5,553,305 A | | 9/1996 | Gregor et al. .............. | 395/826 |
| 5,623,634 A | | 4/1997 | Liu ............................ | 395/478 |
| 5,630,132 A | | 5/1997 | Allran et al. ............... | 395/670 |
| 5,838,766 A | * | 11/1998 | Rand .......................... | 379/9 |
| 6,092,098 A | * | 7/2000 | Araki et al. ................ | 709/201 |
| 6,233,630 B1 | * | 5/2001 | Wilhelm, Jr. ............... | 710/56 |

OTHER PUBLICATIONS

"Intelligent I/O ($I_2O$) Architecture Specification, Revision 1.0", $I_2O$ *Special Interest Group,* published Mar. 1996, pp. 4–1 thru 4–56.

* cited by examiner

*Primary Examiner*—Dieu-Minh Le
(74) *Attorney, Agent, or Firm*—Duft, Setter, Ollila & Bornsen, LLC

(57) ABSTRACT

A shared resource manager circuit for use in conjunction with multiple processors to manage allocation and deallocation of a shared resource. The shared resource manager allocates and deallocates software resources for utilization by the processors in response to allocation and deallocation requests by the processors. The shared resource manager may include a bus arbitrator as required in a particular application for interfacing with a system bus coupled to the processors to provide mutual exclusion in access to the shared resource manager among the multiple processors. The shared resource manager may manage a memory block (FIFO queue) with multiple resource control blocks. A system may advantageously apply a plurality of shared resource managers coupled to a plurality of processors via a common interface bus. Each shared resource manager device may then be associated with management of one particular shared resource.

25 Claims, 3 Drawing Sheets

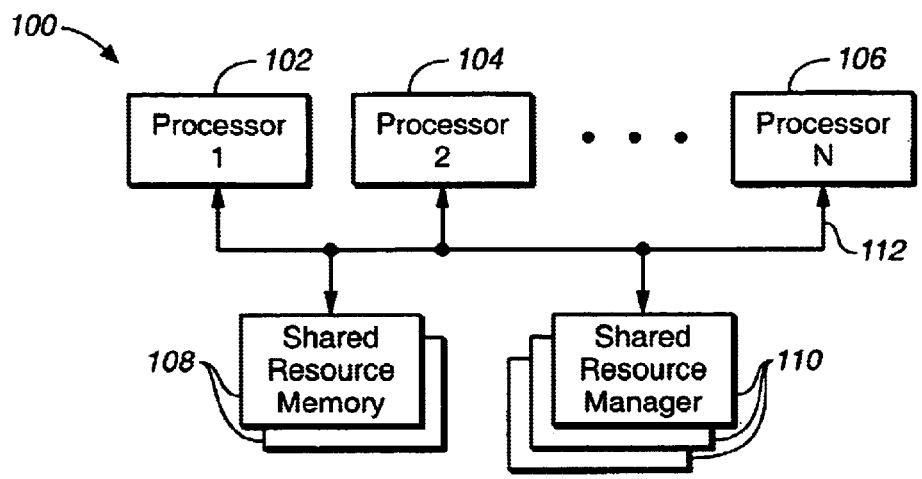
FIG._1
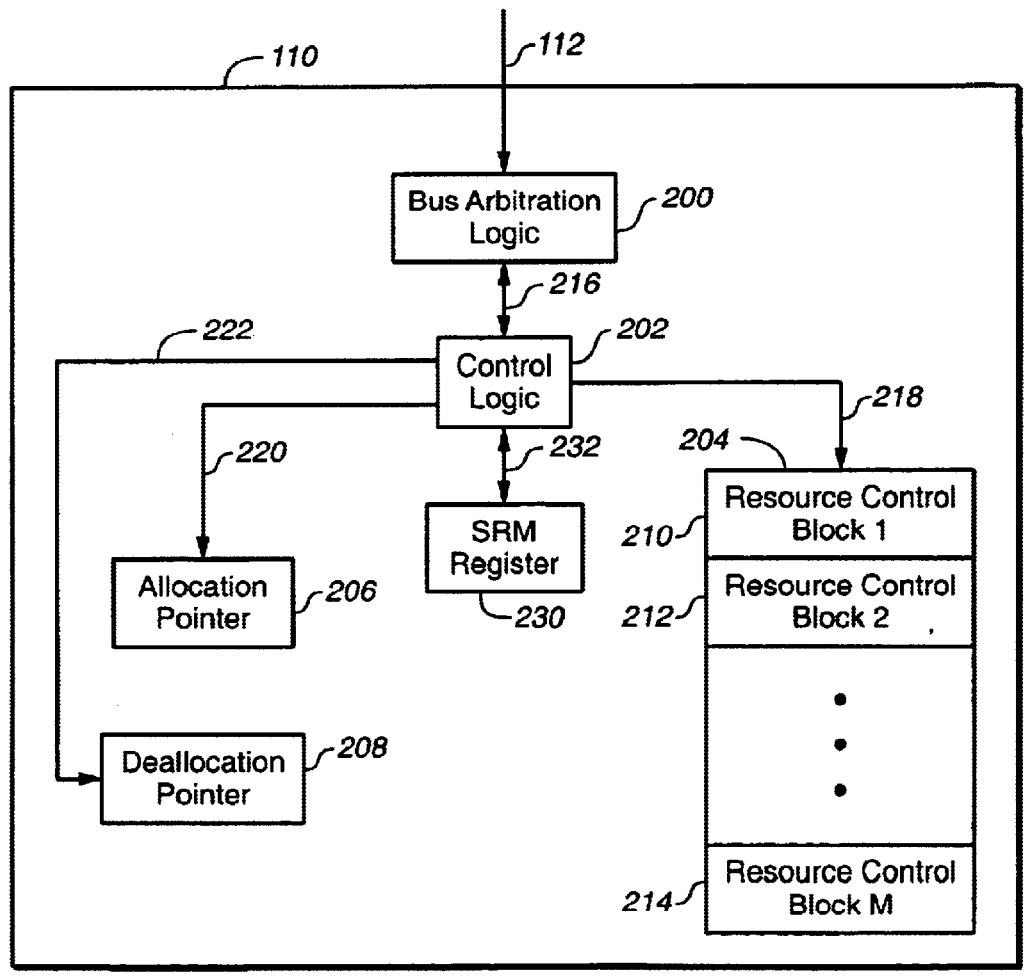
FIG._2

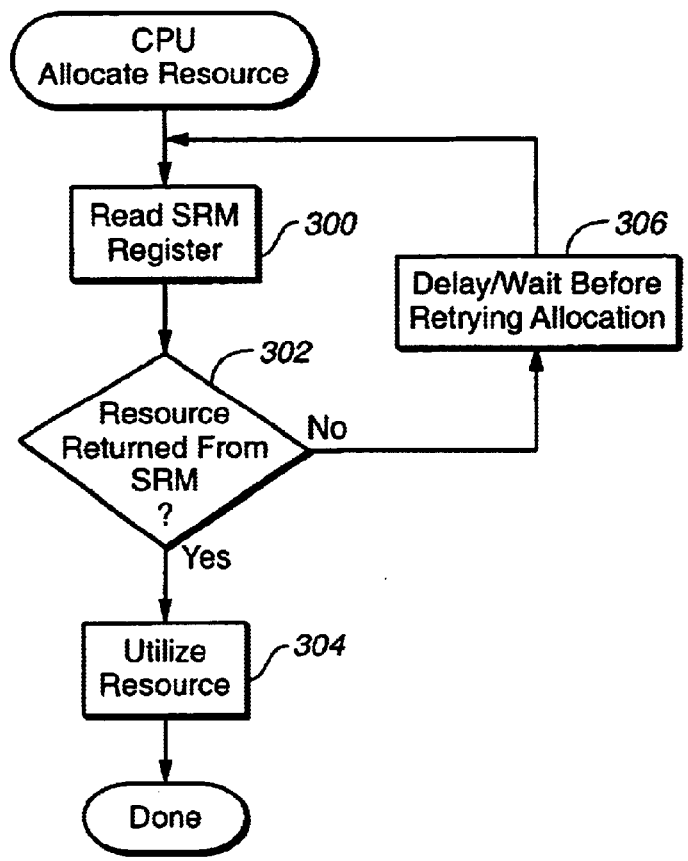
FIG._3
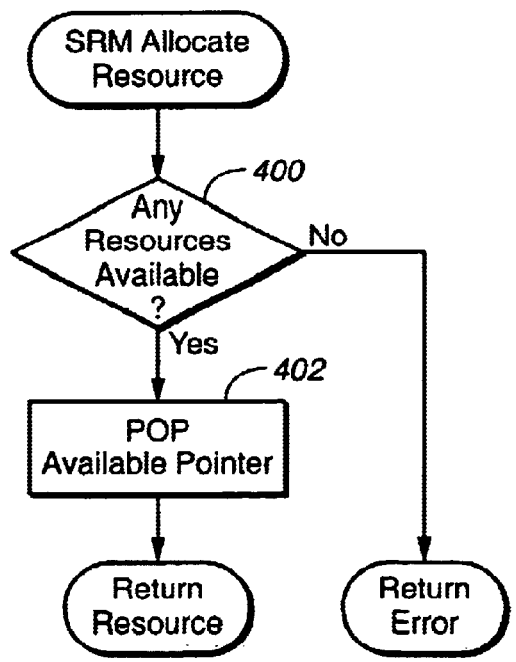
FIG._4

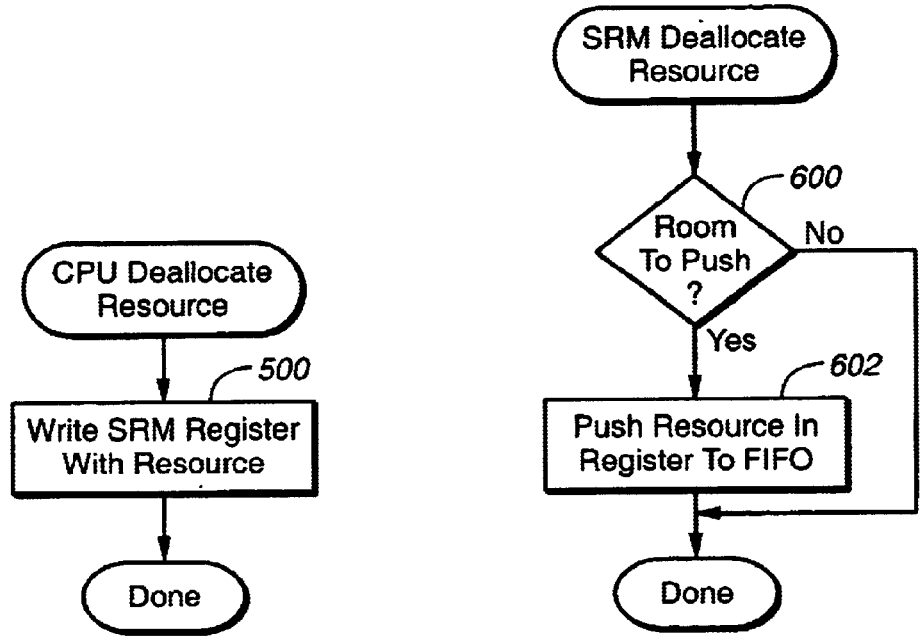
FIG._5   FIG._6
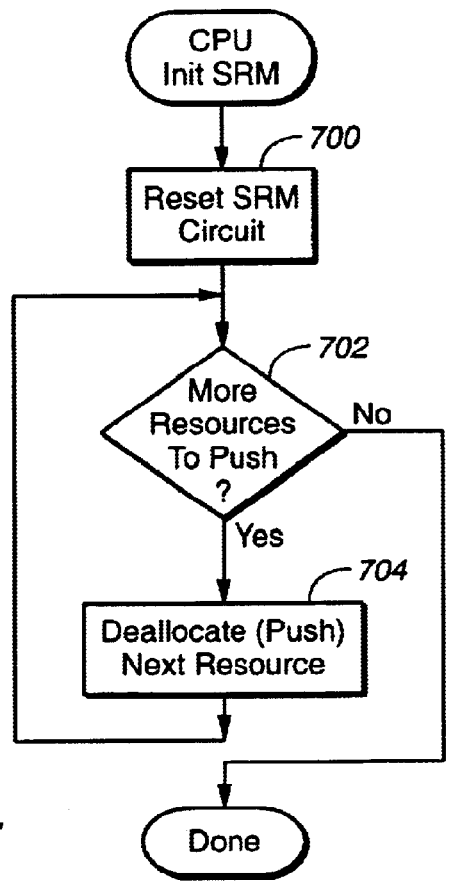
FIG._7

SHARED RESOURCE MANAGER FOR MULTIPROCESSOR COMPUTER SYSTEM

BACKGROUND OF THE INVENTION

1. Field of the Invention

The present invention relates generally to computing systems, and more particularly to the allocation and deallocation of software resources in multiprocessor systems. More specifically, the invention relates to sharing of resources in a multiprocessor storage controller of a storage subsystem.

2. Description of Related Art

Multiprocessor systems are becoming increasingly important in modern computing since combining multiple processors increases processing bandwidth and generally improves throughput, reliability, availability and serviceability. Multiprocessor systems with dynamic allocation and deallocation of system resources (such as control blocks, access to driver routines, etc.) to and from a shared resource pool are well-known in the art. Such software resources are often stored in a shared resource pool or queue to await utilization by a processor. When a processor becomes available and issues a request, software resources are taken from the shared resource pools and transferred to the requesting processor which then utilizes the software resource. Thus, the software resources in the shared resource pool are allocated and utilized one at a time by the next requesting processor.

The pools or queues associated with these shared resources must be accessed by the multiple processors in a coordinated fashion to ensure that each processor manipulates the pools exclusive of the other processors. Such mutual exclusion techniques are well known in software techniques. Such mutual exclusion techniques impose further overhead processing load on the multiple processors of the system.

The efficiency of such systems, however, is significantly reduced by inefficient software resource management schemes. In conventional implementations, the software management routines are executed by the processors. Other software management functions are required to assure mutual exclusivity among the processors sharing the pooled resources. These software management routines require significant numbers of operations for managing queues and updating pointers and for coordinating mutually exclusive access to the shared resources. As a result, these software management routines often require a great deal of processor overhead, which in turn degrades system latency and performance. Furthermore, the processor overhead demands tend to become worse as more processors are added to the system.

These problems also arise in the context of storage systems. It is growing more common for storage subsystem controllers to utilize multiple parallel processors or control modules. Where such controllers and processors share common resources, similar allocation and coordination techniques are applicable. The overhead processing load on the processors of such multiprocessor storage controllers can negatively impact storage subsystem performance.

For example, the I²O interface standard defines a layered model for software interface modules between a computer software application and an I/O interface device. The layers of the model communicate in accordance with application program interfaces (APIs) defined by the specification. A message frame is a fundamental unit of information exchanged between certain of the layers. A message frame address (MFA) is a pointer to one such message frame. A pool of such message frames is maintained in the I²O compliant interface memory. The standard suggests a free list and a post list of MFAs. Each MFA points to one message frame in the pool. Initially all MFAs are on the free list. When a processor requires a message frame for messaging purposes between the layers of the I/O interface, it allocates a next available MFA from the free list. To pass the message to a receiving layer, the message is placed on a post list. A receiving processor then retrieves a next posted MFA from the post list. The message pointed to by the retrieved MFA is processed as appropriate for the messaging application. When the message processing is completed, the MFA is stored back on the free list for further use by another process (or processor).

In addition to management of the lists per se, the processors must also coordinate the mutually exclusive access to the lists. Such mutual exclusion operations consume still further overhead of the processors.

MFA management is but one example of a shared resource pertinent to I²O applications. A wide variety of such software resource are common in the context of storage controllers having multiple processors (i.e., multiple redundant controllers). For example, other common shared resources may include: cache control blocks, recovery control blocks, I/O control structures, scatter/gather list elements, etc.

Further, the problems described above are compounded where multiple such resource must be managed among a plurality of processors. The overhead processing within each of the multiple processors associated with managing a single such shared resource are simply multiplied when managing additional such shared resources.

Accordingly, a need exists for a shared resource management technique in a multiprocessor system that reduces demands on processor overhead and improves system performance.

SUMMARY OF THE INVENTION

The present invention solves the above and other problems, and thereby advances the useful arts, by providing a shared resource manager assist circuit designed to provide assistance to the processors to manage such shared resources and the coordination of mutually exclusive access to the shared resources. Preferably, the shared resource manager is embodied in an integrated circuit chip separate from the processors. The shared resource manager allocates and deallocates software resources for utilization by the processors in response to allocation and deallocation requests by the processors, thereby providing rapid and efficient management of the software resources and improving overall system performance. The standard bus interface of the custom chip provides the mutual exclusivity required for management of a shared resource by multiple processors connected to the manager chip's interface bus.

Generally speaking, the shared resource manager includes a bus arbitrator for interfacing with a system bus coupled to the processors, a memory block with resource control blocks that point to resources stored in a memory, and an allocation/deallocation means that manages a list of available resources.

The present invention is applicable to a wide variety of applications where software resources are shared among a plurality of processors. In one exemplary embodiment, the resource control blocks are message frame address values (MFAs) compliant with 120 specifications. MFA management is exemplary of one such software resource potentially shared among a plurality of processors in an I/O adapter environment having multiple processors performing I/O request processing. Examples of other typical software resources in the context of storage controllers include: cache control blocks, recovery control blocks ("RCB"), I/O control structures, DMA scatter/gather list elements, etc.

An allocation request is processed by the present invention by retrieving the next available RCB on the list being managed. Conversely, a deallocation request puts the RCB provided back on the list as an available RCB. In the I²O exemplary embodiment, the free list and post list would be shared managed resources. Each list is managed as a FIFO stack. In reference to the free list, allocations are referred to as "allocates" while deallocation requests are referred to as "releases."

In particular, the shared resource manager of the present invention is useful where a number of shared resources are managed among the multiple processors. One shared resource manager is allocated for each such shared resource. The assistance provided by such multiple shared resource manager devices in a multiple processor application as dramatically reduces the overhead processing load imposed on the multiple processors.

It is therefore an object of the present invention to provide an apparatus for improving the performance of a multiprocessor system by increasing the utilizaton of the processors.

It is a further object of the present invention to provide an apparatus for facilitating efficient sharing of software resources by a multiprocessor system.

It is a further object of the present invention to provide an apparatus for increasing the speed and efficiency in which a multiprocessor system allocates and deallocates software resources.

It is a further object of the present invention to provide an apparatus for increasing the speed and efficiency in which a multiprocessor system allocates and deallocates multiple shared software resources.

It is a yet another object of the present invention to provide an apparatus for reducing the overhead required to allocate and deallocate software resources in a multiprocessor system.

It is still another object of the present invention to provide an apparatus for allocating and deallocating software resources in a multiprocessor system that is wellsuited for implementing the I²O architecture specification.

These and other objects, features and advantages of the invention will be further described and more readily apparent from a review of the detailed description of the preferred embodiments that follow.

BRIEF DESCRIPTION OF THE DRAWINGS

The following detailed description of the preferred embodiments can best be understood when read in conjunction with the following drawings, in which:

FIG. 1 is a high-level block diagram of an exemplary embodiment of the present invention in which a plurality of processors are coupled to a shared resource manager which allocates and deallocates software resources for the processors;

FIG. 2 is a block diagram of a preferred exemplary embodiment of the shared resource manager of FIG. 1;

FIG. 3 is a flowchart describing a method of the present invention wherein a processor (CPU) allocates a resource from a shared pool using the shared resource its manager of the present invention;

FIG. 4 is a flowchart describing a method of the present invention wherein the shared resource manager allocates a resource from a shared pool in response to a request from a CPU;

FIG. 5 is a flowchart describing a method of the present invention wherein a CPU deallocates a resource from a shared pool using the shared resource manager of the present invention;

FIG. 6 is a flowchart describing a method of the present invention wherein the shared resource manager deallocates a resource from a shared pool in response to a request from a CPU; and FIG. 7 is a flowchart describing a method to initialize a shared resource manager to manage allocation and deallocation of a pool of shared resources.

DETAILED DESCRIPTION OF THE PREFERRED EMBODIMENTS

While the present invention is susceptible to various modifications and alternative forms, specific embodiments thereof have been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 shows a high-level block diagram in which a plurality of processors are coupled to a shared resource manager that allocates and deallocates software resources for the processors in accordance with an exemplary preferred embodiment of the multiprocessor system architecture of the present invention. Multiprocessor system 100 includes processors 102, 104 and 106 depicting the first, second, and Nth processors, respectively, in the system. Thus, multiprocessor system 100 includes N processors. Multiprocessor system 100 also includes shared resource memory 108 and shared resource manager 110. Processors 102, 104 and 106, shared resource memory 108 and shared resource manager 110 are coupled to one another by system bus 112. Shared resource manager 110 serves to allocate and deallocate software resources to and from a shared resource pool. The software resources are allocated in response to allocation requests from the processors and await for utilization by a processor. The software resources are deallocated when utilization by the processors is completed in response to deallocation requests by the processors.

Multiple shared resource managers 110 and associated shared resource memories 108 are shown in FIG. 1. The present invention is particularly useful where multiple shared resources are to be utilized by multiple processors. In the preferred embodiment, one shared resource manager 110 is allocated to each such shared resource to be managed. Processors 102.106 then address the shared resource manager 110 associated with a particular shared resource to be allocated or deallocated. Such addressing of multiple shared resource managers 110 and associating each shared resource manager 110 with a particular shared resource are techniques well known to those skilled in the art.

As previously practiced in the art, each processor 102.106 would incur significant software overhead to manage objects in shared resource memory 108. Additional overhead is involved in coordinating mutually exclusive access to these shared objects in the shared resource memory 108. This overhead is then multiplied where multiple shared resources are being managed among the plurality of processors. Each shared resource manager 110 is preferably implemented as an application specific integrated circuit (ASIC) to provide hardware assistance in the management of such shared resources. The hardware assist offloads the management overhead from the CPUs to thereby improve overall system performance of the system 100.

CPUs 102.106 make allocation requests of the shared resource manager 110. These requests are processed within the shared resource manager to off load such processing detail from the main processors 102.106. The allocation and deallocation requests are preferably implemented as read and write operations, respectively, addressed to the shared resource manage 110. Using standard bus arbitration features on bus 112, shared resource manager 110 coordinates the mutually exclusive access required for management of the shared resources. This bus arbitration coordination of mutual exclusivity further reduces the overhead load on the CPUs.

Those skilled in the art will recognize that the system 100 of FIG. 1 may be advantageously applied, for example, in the context of an I/O interface adapter. In such I/O adapter applications, hierarchical layers of I/O interfaces are defined such that each layer a communicates with another layer according to specified application programming interfaces (APIs). These I/O standards specify these APIs. A key to these standards is the message frame. A message frame is a standardized format for messages used to pass information among certain of the I/O interface layers. A message frame is pointed to by a message frame address (MFA). A pool of MFAs is shared among the various processes of the I/O interface. The MFA pool and the message frames per se are typically stored in a shared memory 108 accessible to the various I/O processes. In a multiprocessor interface such as a storage subsystem controller, the processes sharing the MFA pool may be operable on several of the multiple processors. Shared resource manager 110 provides management of such MFA pools and lists as are utilized in such I/O applications.

FIG. 1 is therefore intended to represent all such applications of shared resource management. I/O applications are one useful application of the techniques and apparatus of the present invention.

FIG. 2 is a block diagram providing additional details of the structure of shared resource manager 110 of FIG. 1. A bus arbitration element 200 arbitrates for control of bus 112 to effectuate transfers of information between the CPUs and the shared resource manager 110 via bus 112. Those skilled in the art will recognize that the bus arbitration element 200 is unique to each particular bus application of the shared resource manager 110. In certain environments, the bus arbitration element may be external to the shared resource manager 110 while in others it may be integrated within the shared resource manager 110 as shown in FIG. 2. Control logic element 202 controls operation of other elements in the shared resource manager 110 according to methods discussed further herein below.

In the preferred embodiment, a FIFO list 204 of resource control blocks 210, 212, 214 is maintained within shared resource manager 110. An allocation pointer 206 points to the next resource control block 210.214 to be allocated for use by an attached processor. Deallocation pointer 208 points to the next location in the FIFO list 204 at which a next freed resource may be added. In the preferred embodiment, FIFO list 204 is a simple FIFO circular queue and allocation pointer 206 and deallocation pointers 208 are circular or wraparound pointers used to manage the circular queue. Those skilled in the art will recognize a number of similar data structures useful to implement the shared resource queue. Further, such structures may be implemented in software or firmware operable in a general purpose processor or in a special purpose processing device as well as in custom application specific integrated circuits (ASICs) or in discrete electronic components. All such alternative embodiments of the features of shared resource manager 110 are within the intended scope of protection of the present invention.

In the preferred embodiment, an attached computer (processor) accesses the shared resource manager 110 using simple read and write operations to the memory address or I/O port associated with the shared resource manager 110 on the interface bus connecting it to the various processors. To allocate a next available resource from the manager 110, an attached processor issues a read request to the shared resource manager 110. Shared resource manager 110 returns the contents of the next resource control block 210.214 via register 230. In other words, the next available resource is placed in register 230 for application to bus 112 via bus arbitration logic 200 under the control of control logic 202. As noted above, bus arbitration logic 200 assures temporary mutual exclusion of other processors until the read request for a next resource is completed.

Control logic 202 first checks to ensure that a resource is available from the shared resource list 204. If no resource is available for allocation as indicated by the present state of the allocation pointer 206 and deallocation pointer 208, then an error value is returned to the requesting processor via bus 112. A reserved value (such as −1) is returned through register 230 to indicate such an error condition. Such error checking associated with the allocation of a resource and the management of a circular queue is known to those skilled in the art as standard design choices in the implementation of the present invention. If a resource is available, the resource value is returned to the requesting processor through register 230 under control of control logic 230 via bus 112 and the allocation pointer 206 is incremented as required for management of list 204.

To deallocate a resource, a processor issues a write request to the memory address or 110 port of the shared resource manager 110 via interface bus 112. The resource to be deallocated is applied to bus 112 by the processor issuing the write request (i.e., as data associated with the write request). The resource value is latched into register 230 by control logic 202. As above, bus arbitration logic 200 assures required mutual exclusivity of the write operation until completion of the deallocation of the supplied resource. Control logic 202 then stores the supplied resource (latched into register 230) in the next unused resource control block 210.214 presently pointed to by deallocation pointer 208. Control logic 202 then increments deallocation pointer 208 as required for circular management of the resource list 204.

Those skilled in the art will recognize that the block diagram of shared resource manager 110 in FIG. 2 is intended as exemplary of a wide variety of implementations. Such design choices are well known to those skilled in the art. Moreover, the best presently known mode of implementation of the present invention depends upon numerous factors, including limitations and requirements of the operating system, hardware design complexity versus cost tradeoffs, software complexity versus cost tradeoffs, performance considerations, and other factors. A key feature of the present invention is that the list management is performed by a device (shared resource manager 110) on a bus 112 in common with processors manipulating the shared resources. The shared resource manager 110 includes all bus arbitration logic to assure required mutual exclusivity in allocating and deallocating the shared resources. This feature simplifies similar control logic previously distributed across each of the processors desiring to manipulate the shared resources.

FIG. 2 is a depiction of a single shared resource manager 110. As noted above the present invention is particularly useful where a plurality of shared resource managers 110 are used—one for each of a plurality of shared resources to be managed among a plurality of processors. For example, each major software resource would be represented by an individual shared resource manage. The application running on the microprocessor would use the appropriate shared resource manager to allocate or deallocate the respective resource. Resource examples include control data structures, scatter/gather list elements, cache page control structures, I/O control structures, database records, etc. The flowcharts of FIGS. 3–7 discussed further herein below are presented in the context of a single processor (CPU) communicating with a single shared resource manager to manage a single shared resource. Those skilled in the art will readily recognize extension of the methods presented to multiple processors accessing multiple shared resources each managed by one of multiple shared resource managers.

FIG. 3 is a flowchart describing the use of one shared resource manager 110 by an attached processor (CPU) on the common bus 112. The processor in need of a shared resource (i.e., an I$^2$O MFA, an I/O control block, a scatter/gather list, etc.), issues a read request at element 300 to the shared resource manager 110. The read request addresses the register 230 of shared resource manager 110 to obtain the next available resource from shared resource manager 110. Element 302 then determines whether an available resource was returned in the read request. As noted above, an error value (such as −1) may be returned from shared resource manager 110 to indicate that no resource is presently available to allocate. If no resource is presently available, processing continues with element 306 to await another opportunity to allocate the required resource. After such a delay and other processing as appropriate, processing of the method continues by looping back to element 300 to retry the allocation of the resource.

Those skilled in the art will recognize a variety of options for processing within a processor when no resource is presently available. The processor may proceed with other processing and attempt the allocation request at a later time. Well known design choices may permit other processing to continue within the requesting CPU in particular applications. The CPU may, for example, await a signal or interrupt from the shared resource manager to indicate that a resource is available for allocation or may simply delay a predetermined or random period of time and retry the allocation. Such processing options within the processor attached to the shared resource manager 110 are outside the scope of the present invention. The wait loop depicted by elements 300, 302 and 306 to request a next available resource is therefore intended merely as exemplary of one possible option for processing within an attached processor in response to the unavailability of a resource at the present time.

When element 302 determines that a resource was properly allocated, the processor then proceeds to element 304 representative of the processing that utilizes the allocated resource.

FIG. 4 is a flowchart describing processing within a shared resource manager 110 in response to a read request form a processor as described above with respect to FIG. 3. Element 400 is first operable to determine whether any resource control block 210.214 is presently available for allocation. This determination is made with reference to the allocation and deallocation pointers 206 and 208 as is well known in the management of a circular queue (list 204). If no resource is available, an error indication (such as a value of −1) is returned to the requesting processor via register 230 and bus 112. If a resource is available, element 402 returns the next available resource and increments the allocation pointer 206 as required to manage the circular FIFO list 204.

Flowchart 5 describes operation of a processor attached to a shared resource manager 110 to deallocate a previously allocated resource. Element 500 is simply operable to issue a write request to shared resource manager 110 via bus 112. The value of the resource to be deallocated is supplied as data in the write request FIG. 6 is a flowchart describing the operation of a shared resource manager 110 in response to the write request of a processor as in FIG. 5. Element 600 is first operable to determine whether room exists in the shared resource list 204 to deallocate the supplied resource. This determination is made with reference to the allocation and deallocation pointers 206 and 208 as is well known in the management of a circular queue (list 204). If no room exists to deallocate the resource, processing completes. Such an error condition would likely not occur in practice but the checking is shown here as exemplary of one possible embodiment of the control logic of the shared resource manager 110 of the present invention. If there is room in the list 204 to deallocate the supplied resource, the resource is "pushed" into the list 204 at the location presently pointed to by the deallocation pointer 208. The deallocation pointer 208 is then incremented as required for management of the circular queue (list 204).

FIG. 7 is a flowchart describing operation of a processor attached to shared resource manager 110 to initialize the shared resource manager 110 by pushing all available resources for management by shared resource manager 110. A processor first issues a reset of the shared resource manager 110 device at element 700. Such a reset of shared resource manager 110 preferably clears all resource control blocks 210.214 and sets the allocation and deallocation pointers 206 and 208 as appropriate to indicate an empty list 204. Elements 702 and 704 are then iteratively operable to push each resource into the shared resource manager 110. Element 702 determines whether any more resources are available to be provided to shared resource manager 110. If so, element 704 pushes (deallocates) the next resource by issuing a write request as shown in FIG. 3. Processing then loops back to element 702 until all resources are pushed into shared resource manager 110.

As noted above, those skilled in the art will recognize a number of equivalent methods and structures within the intended scope of the present invention. Such design choices in implementation of the present invention are well known to those skilled in the art. Further, those skilled in the art will recognize a variety of useful applications of the present invention. As described herein a particularly useful application of the present invention arises in the design of I/O interface adapters where a plurality of parallel processors interact and share multiple shared resources. The device of the present invention simplifies the design of such I/O interface adapter by using the single shared resource manager circuit for each shared resource to manage allocation and deallocation of these shared MFA resources among a plurality of cooperating processors.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a multiprocessor system, a shared resource manager device comprising:
 a bus arbitrator for interfacing with a system bus coupled to multiple processors to assure mutual exclusivity among said multiple processors in accessing said shared resource manager;
 a memory having a plurality of resource control blocks; and
 a control circuit that allocates and deallocates resource control blocks in response to requests from said multiple processors.

2. The device of claim 1 wherein said memory comprises a FIFO queue, and wherein said control circuit includes:
 an allocation pointer that points to the next available resource control block in said FIFO queue; and
 a deallocation pointer that points to the next free resource control block in said FIFO queue.

3. The device of claim 1 further comprising:
 a register wherein said register receives a resource value to be deallocated in response to a deallocate request from one of said multiple processors and wherein said register returns a resource value to one of said multiple processors in response to an allocate request from one of said multiple processors.

4. The device of claim 3
 wherein said deallocate request comprises a memory write request to said register by one of said multiple processors and wherein said resource value is supplied as data in said memory write request and wherein said resource value is latched into said register by said memory write request, and
 wherein said allocate request comprises a memory read request to said register by one of said multiple processors and wherein said resource value is returned to one of said multiple processors via said register by said memory read request.

5. The device of claim 3
 wherein said deallocate request comprises an I/O port write request to said register by one of said multiple processors and wherein said resource value is supplied as data in said I/O port write request and wherein said resource value is latched into said register by said I/O port write request, and
 wherein said allocate request comprises an I/O port read request to said register by one of said multiple processors and wherein said resource value is returned to one of said multiple processors via said register by said I/O port read request.

6. A device for managing message frame addresses in a multiple processor 120 compatible interface adapter comprising:
 a bus arbitration circuit for coupling said device to a bus connected to the multiple processors and for providing mutually exclusive access to said device by the multiple processors;
 a FIFO queue of message frame address values;
 an allocation circuit coupled to said FIFO queue and to said bus arbitration circuit to allocate a next available message frame address from said FIFO queue in response to an allocate request from one of the multiple processors; and
 a deallocation circuit coupled to said FIFO queue and to said bus arbitration circuit to deallocate a previously allocated message-frame address in response to a deallocate request from one of the multiple processors.

7. The device of claim 6 further comprising:
 a register coupled to said allocation circuit and coupled to said deallocation circuit and coupled to said bus arbitration circuit for exchanging a message frame address between said device and one of the multiple processors in response to allocation and deallocation requests from the multiple processors,
 wherein an allocation request comprises a read request by one of the multiple processors to retrieve a next available message frame address from said register of said device, and
 wherein a deallocation request comprises a write request by one of the multiple processors to provide in said register a message frame address to be returned to said FIFO queue as an available message frame address.

8. The device of claim 7 wherein said read request comprises a memory address read request directed to said register and wherein said write request comprises a memory address write request directed to said register.

9. The device of claim 7 wherein said read request comprises an I/O port read request directed to said register and wherein said write request comprises an I/O port write request directed to said register.

10. A method of managing message frame addresses in an $I^2O$ compliant interface adapter having multiple processors comprising the steps of:
 receiving, within a shared resource manager device coupled to said multiple processors, an allocation request from one of said multiple processors;
 assuring mutually exclusive access to the shared resource manager by said one of said multiple processors by arbitrating among said multiple processors;
 returning to said one of said multiple processors a next available message frame address from a queue of available message frame addresses managed by said shared resource manager device;
 receiving, within said shared resource manager device, a deallocation request from one of said multiple processors specifying a free message frame resource address no longer in use by said one of said multiple processors; and
 storing said free message frame address in said queue of available message frame addresses.

11. The method of claim 10 wherein the step of receiving an allocate request comprises the step of:
 receiving a memory address read request addressed to a register in said shared resource manager device.

12. The method of claim 10 wherein the step of receiving an allocate request comprises the step of:
 receiving an I/O port read request addressed to a register in said shared resource manager device.

13. The method of claim 10 wherein the step of receiving a deallocate request comprises the step of:
 receiving a memory address write request addressed to a register in said shared resource manager device.

14. The method of claim 10 wherein the step of receiving a deallocate request comprises the step of:

receiving an I/O port write request addressed to a register in said shared resource manager device.

15. A system comprising:

an interface bus;

a plurality of processors coupled to said interface bus; and a plurality of shared resource manager devices coupled to said interface bus wherein each of said plurality of shared resource managers comprises:

a bus arbitrator for interfacing with said interface bus to assure mutual exclusivity among said plurality of processors in accessing said shared resource manager;

a memory having a plurality of resource control blocks; and a control circuit that allocates and deallocates resource control blocks in response to requests from said multiple processors.

16. The system of claim 15 wherein said memory comprises a FIFO queue, and wherein said control circuit includes:

an allocation pointer that points to the next available resource control block in said FIFO queue; and a deallocation pointer that points to the next free resource control block in said FIFO queue.

17. The system of claim 15 wherein each of said plurality of shared resource managers further comprises:

a register wherein said register receives a resource value to be deallocated in response to a deallocate request from one of said multiple processors and wherein said register returns a resource value to one of said multiple processors in response to an allocate request from one of said multiple processors.

18. The system of claim 17 wherein said deallocate request comprises a memory write request to said register by one of said plurality of processors and wherein said resource value is supplied as data in said memory write request and wherein said resource value is latched into said register by said memory write request, and wherein said allocate request comprises a memory read request to said register by one of said plurality of processors and wherein said resource value is returned to one of said plurality of processors via said register by said memory read request.

19. The device of claim 17 wherein said deallocate request comprises an I/O port write request to said register by one of said plurality of processors and wherein said resource value is supplied as data in said I/O port write request and wherein said resource value is latched into said register by said I/O port write request, and wherein said allocate request comprises an I/O port read request to said register by one of said plurality of processors and wherein said resource value is returned to one of said plurality of processors via said register by said I/O port read request.

20. An I/O adapter comprising:

a plurality of processes operable on a plurality of processors wherein said plurality of processes cooperatively process I/O requests received by said I/O adapter;

a plurality of shared software structure resources stored in a memory associated with said plurality of processors wherein each shared software structure is accessed by at least one of said plurality of processes; and a plurality of shared resource manager devices coupled to said plurality of processors wherein each of said plurality of shared resource manager devices is associated with a corresponding shared software structure resource of said plurality of shared software structure resources, wherein each shared resource manager device includes a bus arbitrator for providing mutually exclusive access to said each shared resource manager device by the plurality of processors.

21. The I/O adapter of claim 20 wherein at least one of said plurality of shared software structure resources is an I/O control structure.

22. The I/O adapter of claim 20 wherein at least one of said plurality of shared software structure resources is a cache control structure.

23. The I/O adapter of claim 20 wherein at least one of said plurality of shared software structure resources is a recovery control structure.

24. The I/O adapter of claim 20 wherein at least one of said plurality of shared software structure resources is a DMA scatter/gather list structure.

25. The I/O adapter of claim 20 wherein at least one of said plurality of shared software structure resources is an I$^2$O compliant message frame address structure.

* * * * *